(12) United States Patent
Nakanishi et al.

(10) Patent No.: US 9,543,578 B2
(45) Date of Patent: Jan. 10, 2017

(54) NEGATIVE ELECTRODE ACTIVE MATERIAL FOR NON-AQUEOUS ELECTROLYTE SECONDARY BATTERY AND METHOD FOR MANUFACTURING THE SAME

(71) Applicant: SHIN-ETSU CHEMICAL CO., LTD., Tokyo (JP)

(72) Inventors: Tetsuo Nakanishi, Annaka (JP); Yoshiyasu Yamada, Annaka (JP); Kazuyuki Taniguchi, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 327 days.

(21) Appl. No.: 13/662,061

(22) Filed: Oct. 26, 2012

(65) Prior Publication Data

US 2013/0108923 A1    May 2, 2013

(30) Foreign Application Priority Data

Nov. 1, 2011    (JP) .................................. 2011-240680

(51) Int. Cl.

| | |
|---|---|
| *H01M 4/04* | (2006.01) |
| *H01M 4/38* | (2006.01) |
| *B82Y 30/00* | (2011.01) |
| *C01B 33/021* | (2006.01) |
| *H01M 4/134* | (2010.01) |
| *H01M 4/62* | (2006.01) |
| *H01M 10/0525* | (2010.01) |

(52) U.S. Cl.
CPC .............. *H01M 4/386* (2013.01); *B82Y 30/00* (2013.01); *C01B 33/021* (2013.01); *H01M 4/0421* (2013.01); *H01M 4/134* (2013.01); *H01M 4/622* (2013.01); *H01M 10/0525* (2013.01); *C01P 2002/72* (2013.01); *C01P 2004/62* (2013.01); *C01P 2004/64* (2013.01); *C01P 2006/12* (2013.01); *Y02E 60/122* (2013.01); *Y02P 70/54* (2015.11)

(58) Field of Classification Search
CPC .................................................. H01M 4/0421
See application file for complete search history.

(56) References Cited

U.S. PATENT DOCUMENTS

| | | |
|---|---|---|
| 5,556,721 A | 9/1996 | Sasaki et al. |
| 6,413,672 B1 | 7/2002 | Suzuki et al. |
| 6,685,804 B1 | 2/2004 | Ikeda et al. |
| 6,887,511 B1 | 5/2005 | Shima et al. |
| 2006/0275662 A1 | 12/2006 | Hirose et al. |
| 2009/0317722 A1* | 12/2009 | Watanabe ................ 429/231.95 |
| 2010/0178566 A1* | 7/2010 | Kogetsu et al. .......... 429/231.95 |
| 2010/0266902 A1* | 10/2010 | Takano et al. ........... 429/231.95 |
| 2012/0244441 A1* | 9/2012 | Noda et al. ................ 429/218.1 |

FOREIGN PATENT DOCUMENTS

| | | |
|---|---|---|
| JP | B2-82-2964732 | 10/1999 |
| JP | A-2000-173596 | 6/2000 |
| JP | B2-3079343 | 8/2000 |
| JP | B2-3291260 | 6/2002 |
| JP | A-2003-109590 | 4/2003 |
| JP | A-2004-185991 | 7/2004 |
| JP | A-2004-303593 | 10/2004 |
| JP | B2-3702223 | 10/2005 |
| JP | B2-3702224 | 10/2005 |
| JP | A-2005-317309 | 11/2005 |
| JP | A-2006-338996 | 12/2006 |
| JP | B2-4183488 | 11/2008 |
| JP | A-2009-224168 | 10/2009 |
| WO | WO 2011/071154 A1 | 6/2011 |

OTHER PUBLICATIONS

Dec. 4, 2013 Search Report issued in European Patent Application No. 12007399.4.
"Mukikagaku Zensho (*Encyclopedia of Inorganic Chemistry*) XII-2 Kelso (Silicon)" (published Jul. 1986 by Maruzen), p. 184.
Sep. 25, 2015 Office Action issued in Chinese Patent Application No. 201210430647.9.
Mar. 24, 2016 Office Action issued in Taiwanese Patent Application No. 101140543.

* cited by examiner

*Primary Examiner* — Carlos Barcena
*Assistant Examiner* — Wojciech Haske
(74) *Attorney, Agent, or Firm* — Oliff PLC

(57) ABSTRACT

A method for manufacturing a negative electrode active material for a secondary battery that uses a non-aqueous electrolyte, including the steps of: depositing silicon according to an electron beam vapor-deposition method with metallic silicon as a raw material on a substrate of which temperature is controlled from 800 to 1100° C. at a vapor deposition rate exceeding 1 kg/hr in the range of film thickness of 2 to 30 mm; and pulverizing and classifying the deposited silicon to obtain the negative electrode active material. As a result, there is provided a method for manufacturing a negative electrode active material of silicon particles as an active material useful for a negative electrode of a non-aqueous electrolyte secondary battery that is, while maintaining high initial efficiency and battery capacity of silicon, excellent in the cycle characteristics and has a reduced volume change during charge/discharge.

10 Claims, No Drawings

NEGATIVE ELECTRODE ACTIVE MATERIAL FOR NON-AQUEOUS ELECTROLYTE SECONDARY BATTERY AND METHOD FOR MANUFACTURING THE SAME

BACKGROUND OF THE INVENTION

Field of the Invention

The present invention relates to an active material that is used as a negative electrode material for a non-aqueous electrolyte secondary battery such as a lithium ion secondary battery, in particular, silicon particles very useful as a negative electrode active material, and a method for manufacturing the same. Further, the present invention relates to a negative electrode for a non-aqueous electrolyte secondary battery that uses the negative electrode material and a non-aqueous electrolyte secondary battery that uses the negative electrode material.

Description of the Related Art

With the remarkable development of portable electronic devices and communication devices in recent years, there is a strong demand for a non-aqueous electrolyte secondary battery having higher energy density from the viewpoint of economic efficiency and reduction in size and weight of devices.

Since silicon has a theoretical capacity of 4200 mAh/g far higher than a theoretical capacity of 372 mAh/g of a carbon material that is put in practical use at the present time, it is a material most expected in miniaturization and higher capacity of a battery.

Silicon is known in various forms different in a crystal structure according to a manufacturing method thereof. For example, patent document 1 discloses a lithium ion secondary battery that uses single crystal silicon as a support of a negative electrode active material. Patent document 2 discloses a lithium ion secondary battery that uses a lithium alloy $Li_xSi$ (x: 0 to 5) of single crystal silicon, polycrystalline silicon and amorphous silicon, $Li_xSi$ that uses amorphous silicon is particularly preferred, and pulverized crystalline silicon covered with amorphous silicon obtained by plasma decomposition of monosilane is illustrated. However, in this case, as shown in Example, 30 parts by weight of silicon and 55 parts by weight of graphite as a conductive agent were used; accordingly, battery capacity of silicon could not be fully exerted.

Further, patent documents 3 to 5 disclose a method where an amorphous silicon thin film is deposited on an electrode current collector by vapor deposition and this is used as a negative electrode. There is also disclosed a method where in the method where silicon is directly vapor grown on the current collector, when a direction of growth is controlled, the cycle characteristics can be prevented from deteriorating due to volume expansion (see patent document 6). According to this method, it is said that an electrode having high capacity and excellent cycle characteristics can be manufactured. However, there were problems that due to limited production speed, the cost is high, a silicon thin film is difficult to make thicker, and copper that is a negative electrode current collector diffuses into silicon.

Accordingly, in recent years, a method where while using silicon particles, a usage rate of silicon in battery capacity is restricted to suppress volume expansion (patent documents 7 to 9), a method where as a method where a grain boundary of polycrystalline particles is used as a buffering region of the volume change, a method where a silicon melt in which alumina is added is quenched (see patent document 10), polycrystalline particles configured of mixed phase polycrystals of α, β-$FeSi_2$ (see patent document 11), and a high-temperature plastic forming process of a single crystal silicon ingot (see patent document 12) are disclosed.

As was described above, in order to use silicon as an active material, metallic silicon and silicon alloys, which have various kinds of crystal structures, have been proposed. However, all of these are disadvantageous from the viewpoint of the cost. That is, a method that allows to mass produce at low cost has not been proposed.

CITATION LIST

Patent Documents

Patent Document 1: Japanese Patent No. 2964732
Patent Document 2: Japanese Patent No. 3079343
Patent Document 3: Japanese Patent No. 3702223
Patent Document 4: Japanese Patent No. 3702224
Patent Document 5: Japanese Patent No. 4183488
Patent Document 6: Japanese Unexamined Patent Publication (Kokai) No. 2006-338996
Patent Document 7: Japanese Unexamined Patent Publication (Kokai) No. 2000-173596
Patent Document 8: Japanese Patent No. 3291260
Patent Document 9: Japanese Unexamined Patent Publication (Kokai) No. 2005-317309
Patent Document 10: Japanese Unexamined Patent Publication (Kokai) No. 2003-109590
Patent Document 11: Japanese Unexamined Patent Publication (Kokai) No. 2004-185991
Patent Document 12: Japanese Unexamined Patent Publication (Kokai) No. 2004-303593

SUMMARY OF THE INVENTION

It has been general that a deposition rate of an electron beam vapor deposition device of 20 kW or less is several grams to several tens grams per hour. In this case, a film thickness of the deposited material is around several micrometers and a deposition plate is heated to about 100 to 300° C. However, in order to use as a negative electrode material for lithium ion secondary batteries, a large amount of the negative electrode active material is demanded to be produced at low cost. Accordingly, the deposition rate of 1 kg/hr or more, particularly, about 5 kg/hr is necessary. When a very high deposition rate such as mentioned above is used, in the case where the deposition plate temperature is low as ever, there was a problem that pores are generated in a deposited film to increase the specific surface area.

The present invention was conducted in view of the problems, and it is an object of the invention to provide a less expensive method for manufacturing a negative electrode active material of silicon particles as an active material useful as a negative electrode of a non-aqueous electrolyte secondary battery that, while maintaining high initial efficiency and battery capacity of silicon, is excellent in the cycle characteristics and has a reduced volume change during charge/discharge, a negative electrode active material, a negative electrode material for a non-aqueous electrolyte secondary battery that uses the negative electrode active material, a negative electrode, and further a novel non-aqueous electrolyte secondary battery.

In order to solve the problem, the present invention provides a method for manufacturing a negative electrode active material for a secondary battery that uses a non-aqueous electrolyte, including the steps of: depositing silicon according to an electron beam vapor-deposition method with metallic silicon as a raw material on a substrate of which temperature is controlled from 800 to 1100° C. at a vapor deposition rate exceeding 1 kg/hr in the range of film thickness of 2 to 30 mm; and pulverizing and classifying the deposited silicon to obtain the negative electrode active material.

When polycrystalline silicon particles obtained according to the manufacturing method like this are used as a negative electrode active material for a secondary battery that uses a non-aqueous electrolyte, a non-aqueous electrolyte secondary battery that, while maintaining high initial efficiency and battery capacity of silicon, is excellent in the cycle characteristics and has a reduced volume change during charge/discharge can be obtained. Further, with less expensive metallic silicon as a raw material, a large amount of polycrystalline silicon particles suitable for a negative electrode active material having excellent battery characteristics can be manufactured; accordingly, the manufacturing cost can be largely reduced more than ever. Further, when, according to the invention, metallic silicon is deposited by vapor deposition on a substrate that is controlled at a temperature from 800 to 1100° C., silicon particles extremely small in the BET specific surface area can be obtained.

In this case, when silicon is deposited on the substrate with the metallic silicon as a raw material, one or more of dopants selected from boron, aluminum, phosphorus, titanium, vanadium, chromium, manganese, iron, cobalt, nickel, copper, zinc, germanium, arsenic, tin, tantalum, and tungsten are preferably doped in the silicon to be deposited.

By doping the dopant when silicon is deposited on a substrate like this, the bulk conductivity of the resulted negative electrode active material can be further improved; accordingly, a negative electrode active material that can form a secondary battery more excellent in the cycle characteristics can be obtained.

Further, the pulverization and classification are preferably conducted so that a particle size of the negative electrode active material for a non-aqueous electrolyte secondary battery may be 1 μm or more and 20 μm or less by a volume average value $D_{50}$ according to a laser diffraction scattering particle size distribution measurement method.

When the $D_{50}$ is set to 1 μm or more, the risk of large specific surface area and small negative electrode film density can be made as small as possible. Further, when the $D_{50}$ is set to 20 μm or less, the risk of penetrating through a negative electrode film to cause short-circuiting can be suppressed to the minimum, and, without making difficult to form an electrode, the likelihood of peeling off a current collector can be made sufficiently low.

Further, the substrate is preferably made of a material that does not form an alloy with silicon when depositing silicon.

By depositing the metallic silicon as a raw material on a substrate of a material that does not form an alloy with silicon during deposition of silicon, unnecessary metal impurity can be prevented from diffusing, and, when pulverizing and classifying the deposited silicon, the deposited silicon can be readily peeled off the substrate and the pulverization and classification can be smoothly started. Accordingly, the productivity can be made higher, and a less expensive method for manufacturing a negative electrode active material can be obtained.

Further, the present invention provides a negative electrode active material for a non-aqueous electrolyte secondary battery, which is manufactured according to a method for manufacturing a negative electrode active material for a non-aqueous electrolyte secondary battery of the present invention.

A negative electrode active material of polycrystalline silicon particles obtained according to the method for manufacturing a negative electrode active material of the present invention is suitable for a non-aqueous electrolyte secondary battery that is, as described above, while being less expensive compared with existing negative electrode active materials and maintaining high initial efficiency and battery capacity of silicon, excellent in the cycle characteristics and reduced in the large volume change during charge/discharge.

It is preferable that the negative electrode active material for a non-aqueous electrolyte secondary battery is made of polycrystalline silicon having the true density of higher than 2.250 g/cm$^3$ and less than 2.330 g/cm$^3$, the BET specific surface area of 0.1 to 2.0 m$^2$/g, and the compressive strength of particles of exceeding 400 MPa and smaller than 800 MPa. It is also preferable that silicon particles in the polycrystal are 20 nm or more and 100 nm or less as a value obtained according to a Scherrer method from a half maximum full-width of a diffraction line attributed to Si (111) in the neighborhood of 2θ=28.4° in an analysis of an X-ray diffraction pattern.

The negative electrode active material of polycrystalline silicon like this has a crystal structure where the true density is higher than 2.250 g/cm$^3$ and less than 2.330 g/cm$^3$, which is lower than that of the metallic silicon (2.33 g/cm$^3$), and the compressive strength is higher by about 100 MPa than that of single crystal silicon (400 MPa) and capable of enduring strain due to the volume expansion. That is, the volume expansion due to the charge is ½ to ⅓ compared with that of general metallic silicon or polycrystalline silicon. Accordingly, when a negative electrode active material of polycrystalline silicon particles remarkably small in the volume expansion like this is used in a negative electrode, a high capacity is obtained, and the electrode density during charge can be made to 0.4 to 0.9 g/cm$^3$, that is, the battery capacity per volume can be increased. Further, since the BET specific surface area is 0.1 to 2.0 m$^2$/g, an electrolyte solution is less decomposed on a surface, and a binder is required less. Still further, since silicon particles in the polycrystal are 20 nm or more and 100 nm or less as a value obtained according to a Scherrer method from a half maximum full-width of a diffraction line attributed to Si (111) in the neighborhood of 2θ=28.4° in an analysis of an X-ray diffraction pattern, the initial efficiency, the capacity and the cycle characteristics are prevented from deteriorating. That is, a negative electrode active material for a non-aqueous electrolyte secondary battery, in which the characteristics of silicon excellent in the initial efficiency and the battery capacity are maintained and the cycle characteristics and the volume change during charge/discharge, which are disadvantages of the existing silicon, are largely improved can be obtained.

Further, the present invention provides a negative electrode material for a secondary battery that uses a non-aqueous electrolyte, in which at least a negative electrode active material for a non-aqueous electrolyte secondary battery of the present invention is included.

Thus, a negative electrode material of a negative electrode active material of the invention is a negative electrode material that has an excellent point in the initial efficiency and battery capacity of silicon, is mainly formed of polycrystalline silicon particles having small change rate in the cycle characteristics and the volume, and is suitable for a negative electrode of a non-aqueous electrolyte secondary battery excellent in the battery characteristics such the cycle characteristics and charge/discharge characteristics more than ever.

Herein, the negative electrode material of the invention preferably further contains a binder.

Thus, when the negative electrode material of the invention contains a binder, even when expansion and contraction due to charge/discharge are repeated, the negative electrode material is assuredly and readily prevented from breaking down and powderizing, and the conductivity of the electrode itself can be made higher.

Further, the binder is preferable to be a polyimide resin.

Thus, when the binder is a polyimide resin, a negative electrode material for a non-aqueous electrolyte secondary battery that is excellent in the adhesiveness with a current collector such as copper and high in the initial charge/discharge efficiency, can alleviate the volume change during charge/discharge, and is more excellent in the cycle characteristics and the cycle efficiency due to repetition can be obtained.

Further, the negative electrode material of the invention further contains a conductive agent, and it is preferable that, with respect to the negative electrode material for the non-aqueous electrolyte secondary battery, a ratio of the negative electrode active material for a non-aqueous electrolyte secondary battery is 60 to 97% by mass, a ratio of the binder is 3 to 20% by mass and a ratio of the conductive agent is 0 to 37% by mass.

Thus, when the negative electrode material of the invention contains a conductive agent and a mixing ratio of the negative electrode active material, the binder and the conductive agent is in the above range, even when the expansion and contraction due to charge/discharge is repeated, the negative electrode material can be surely and readily prevented from being broken down and powderized, and the conductivity of the negative electrode material can be made higher. Accordingly, a negative electrode material for a non-aqueous electrolyte secondary battery excellent in the cycle characteristics can be obtained.

Further, the conductive agent is a dispersion liquid in which a conductive material is dispersed in water or a solvent, and a ratio of the conductive material is preferably 1 to 37% by mass with respect to the negative electrode material for a non-aqueous electrolyte secondary battery.

When the conductive agent in the above mode is contained at a ratio like this, the conductivity of the negative electrode material can be made sufficiently high and the initial resistance can be suppressed to a sufficiently low level. Further, preferably, the battery capacity can be surely prevented from deteriorating.

Further, the invention provides a negative electrode that contains a negative electrode material for a non-aqueous electrolyte secondary battery of the invention, in which the change of film thickness between before and after charging does not exceeds three times.

As described above, the negative electrode material for a non-aqueous electrolyte secondary battery of the invention is a negative electrode material that has the volume expansion due to charging smaller than that of general metallic silicon or polycrystalline silicon and is excellent also in the battery capacity and cycle characteristics. Accordingly, a negative electrode that uses the negative electrode material for a non-aqueous electrolyte secondary battery like this is smaller than ever before in the volume expansion between before and after charging, that is, the change of film thickness between before and after charging does not exceed three times and the battery characteristics are also excellent.

Further, the invention provides a non-aqueous electrolyte secondary battery that includes at least a negative electrode compact that uses the negative electrode for a non-aqueous electrolyte secondary battery of the invention, a positive electrode compact, a separator, and a non-aqueous electrolyte.

As described above, the negative electrode for a non-aqueous electrolyte secondary battery of the invention is a negative electrode suitable for a secondary battery that is small in the deformation and capacity deterioration of a battery and remarkably excellent also in the cycle characteristics and charge/discharge characteristics. Accordingly, also a non-aqueous electrolyte secondary battery having the negative electrode compact formed with the negative electrode like this is a secondary battery remarkably excellent in the cycle characteristics and the charge/discharge characteristics.

Here, the non-aqueous electrolyte secondary battery is preferably a lithium ion secondary battery.

As described above, the non-aqueous electrolyte secondary battery of the invention is a secondary battery that is small in the deformation and capacity deterioration of battery and remarkably excellent in the cycle characteristics. Accordingly, the non-aqueous electrolyte secondary battery of the invention is greatly suitable as a recent lithium ion secondary battery for which high energy density is strongly demanded.

As described above, according to the invention, with less expensive metallic silicon as a raw material, while maintaining high initial efficiency and battery capacity of silicon, polycrystalline silicon particles as an active material effective as a negative electrode of a non-aqueous electrolyte secondary battery that is excellent in the cycle characteristics and is reduced in the volume change during charge/discharge can be produced and supplied a lot and less expensively. Further, a negative electrode material or a negative electrode where a negative electrode active material of such polycrystalline silicon particles is used, and a non-aqueous electrolyte secondary battery that is excellent in the adhesiveness with a current collector, high in the initial efficiency, and excellent in the cycle characteristics and charge/discharge efficiency due to repetition by alleviating the volume change during charge/discharge is provided.

DESCRIPTION OF EMBODIMENTS

Hereinafter, the present invention will be more specifically described.

The present inventors studied hard of a silicon-based active material of which battery capacity per volume exceeds 844 mAh/cc of a carbon material and further exceeds 1500 mAh/cc that is expected to a Si alloy negative electrode active material disclosed until now, and a less expensive manufacturing method thereof.

As a result, it was found that when metallic silicon as a raw material is deposited on a substrate of which temperature is controlled to 800 to 1100° C. and the deposited silicon is pulverized and classified according to a known method, polycrystalline silicon particles that are composed of polycrystalline silicon that has the true density higher than 2.250 g/cm$^3$ and less than 2.330 g/cm$^3$, the BET specific surface area of 0.1 to 2.0 m$^2$/g, and the compressive strength of particles higher by about 100 MPa than that (400 MPa) of single crystal silicon are obtained, in which, as silicon particles in the polycrystal, a value obtained according to a Scherrer method from a half maximum full-width of a diffraction line attributed to Si (111) in the neighborhood of 2θ=28.4° in an analysis of an X-ray diffraction pattern is 20 nm or more and 100 nm or less. It was still further found that since the polycrystalline silicon particles like this are an active material effective for a negative electrode of a non-aqueous electrolyte secondary battery, which has a high initial efficiency and battery capacity of silicon such as exceeding 1500 mAh/cc, is excellent further in the cycle characteristics and is suppressed in the volume change during charge/discharge, and further, less expensive metallic silicon can be used as a raw material, also the production cost can be largely reduced compared with that of existing one.

Further, it was found that a negative electrode material and a negative electrode that use a negative electrode active material like this, and a non-aqueous electrolyte secondary battery that uses the same are excellent in battery characteristics such as the initial efficiency, battery capacity and the cycle characteristics and can be obtained at low cost, and thereby the present invention was completed.

A method for manufacturing a negative electrode active material for a secondary battery that uses a non-aqueous electrolyte of the invention includes the steps of depositing silicon according to an electron beam vapor-deposition method with metallic silicon as a raw material on a substrate of which temperature is controlled from 800 to 1100° C. at a vapor deposition rate exceeding 1 kg/hr in the range of film thickness of 2 to 30 mm; and of pulverizing and classifying the deposited silicon to obtain the negative electrode active material.

A negative electrode active material for a non-aqueous electrolyte secondary battery manufactured according to a method for manufacturing a negative electrode active material like this is made of polycrystalline silicon having the true density higher than 2.250 g/cm$^3$ and less than 2.330 g/cm$^3$, the BET specific surface area of 0.1 to 2.0 m$^2$/g, and the compressive strength of particles exceeding 400 MPa and smaller than 800 MPa. The silicon particles in the polycrystal have 20 nm or more and 100 nm or less as a value obtained according to a Scherrer method from a half maximum full-width of a diffraction line attributed to Si (111) in the neighborhood of 2θ=28.4° in an analysis of an X-ray diffraction pattern.

The negative electrode active material (polycrystalline silicon particles) according to the invention has, while showing a value of the true density higher than 2.250 g/cm$^3$ and lower than 2.330 g/cm$^3$, which are lower than 2.33 g/cm$^3$ of single crystal silicon, the BET specific surface area of 0.1 to 2.0 m$^2$/g, which is the same as that of single crystal silicon, when the volume average value $D_{50}$ according to a laser scattering and diffracting particle size distribution measurement method is set to 1 μm or and 20 μm or less.

The negative electrode active material according to the invention has small true density of particle and small BET specific surface area. From this, a crystallographic structure of the negative electrode active material is featured in being polycrystalline silicon particles having a random arrangement close to amorphous but do not taking a porous structure. Since the negative electrode active material of the invention has a crystallographic structure like this, the compressive strength of particles increases by 100 MPa in comparison with that of single crystal silicon.

The negative electrode active material of the invention is an aggregate of crystallites that are 20 nm or more and 100 nm or less by a value obtained according to a Scherrer method from a half maximum full-width of a diffraction line attributed to Si (111) in the neighborhood of 2θ=28.4° in an analysis of an X-ray diffraction pattern.

The negative electrode active material (polycrystalline silicon particles) according to the invention is, owing to the volume expansion alleviating effect of a grain boundary of nanosize grains, small in the volume expansion due to charge/discharge compared with that of general metallic silicon and polycrystalline silicon, and suppressed to about ½ to ⅓ thereof. Accordingly, when the polycrystalline silicon particles are used in a negative electrode of a nonaqueous electrolyte secondary battery, a non-aqueous electrolyte secondary battery that can endure the stress due to volume expansion change due to charge/discharge, is high in capacity, and can have an increased battery capacity per volume.

Since the negative electrode active material according to the invention has a small BET specific surface area, an electrolyte liquid is less decomposed on a surface thereof, a binder in the negative electrode material can be reduced, and an increase in the irreversible capacity can be suppressed to the minimum level. Further, since the negative electrode active material according to the invention is an aggregate of crystallites of 20 nm or more and 100 nm or less, a range small in strain of particles due to the volume change due to charge/discharge and suitable for preventing the initial efficiency, capacity and the cycle characteristics from deteriorating is obtained.

Accordingly, the negative electrode active material according to the invention maintains the characteristics of silicon excellent in the initial efficiency and battery capacity and is largely improved in the cycle characteristics and the volume change during charge/discharge, which have been disadvantage of silicon, and is a negative electrode active material useful for improving the battery characteristics.

Then, a method for manufacturing a negative electrode active material for a non-aqueous electrolyte secondary battery according to the invention, a negative electrode material of the negative electrode active material, a negative electrode, and a non-aqueous electrolyte secondary battery will be detailed. However, the present invention is not restricted thereto.

According to a method for manufacturing a negative electrode active material for a non-aqueous electrolyte secondary battery of the invention, firstly, according to an electron beam vapor-deposition method with metallic silicon as a raw material, silicon is deposited in the range of film thickness of 2 to 30 mm on a substrate of which temperature is controlled from 800 to 1100° C., at a vapor deposition rate exceeding 1 kg/hr.

Here, as silicon, depending on the difference of the crystallinity, single crystal silicon, polycrystalline silicon, and amorphous silicon are known. Alternatively, depending on the difference of purity, chemical grade silicon and metallurgical grade silicon called metallic silicon are known.

Among these, the polycrystalline silicon is a crystal having partial regularity. On the other hand, the amorphous silicon is different in that, Si atoms are almost irregularly arranged with a network structure. Further, the polycrystalline silicon contains relatively large crystal grains having different orientation and a grain boundary is present between the respective grains.

The polycrystalline silicon like this can be synthesized according to a vapor-phase deposition method from monosilane or trichlorosilane as described for example in "Mukikagaku Zensho (Encyclopedia of Inorganic Chemistry) XII-2 Keiso (Silicon)" (published by Maruzen), p. 184.

However, although the vapor-phase deposition method with a silane gas is a manufacturing method effective in obtaining polycrystalline silicon having high purity, since expensive high purity silane gas is used, also the resulted polycrystalline silicon becomes expensive and necessarily resulting in an expensive non-aqueous electrolyte secondary battery.

Further, according to a method of depositing on a copper current collector, which is a known method (see Patent Documents 3 to 5, for example), by controlling a substrate temperature at less than 300° C., and at a film thickness of about several micrometers, amorphous silicon is obtained. In this case, the step of pulverizing and classifying after recovering amorphous silicon is not described, and it is difficult to recover.

On the other hand, according to the present invention, as a raw material that is deposited according to a vapor-deposition method, not a silane gas but metallic silicon is directly used. As the metallic silicon like this, as described above, less expensive metallic silicon called as metallurgical grade or chemical grade can be used.

A vapor-deposition method is variously different depending on a heating method. According to a method for manufacturing a negative electrode active material for a non-aqueous electrolyte secondary battery of the present invention, an electron beam heating method that is more excellent in the thermal efficiency and more advantageous than an induction heating method is used. In a vapor deposition method according to the electron beam vapor deposition method, a raw material of metallic silicon, for example, is housed in a copper hearth and a chamber is depressurized. The degree of decompression can be set generally to $1 \times 10^{-5}$ to $1 \times 10^{-2}$ Pa. When the degree of decompression is $1 \times 10^{-5}$ Pa or better, while an increase in a deposited amount can be expected, a burden on a decompressor is huge to be likely to result in a high-cost equipment. On the other hand, when the degree of compression is $1 \times 10^{-2}$ Pa or worse, an output from an electron gun does not stabilize to be difficult to heat by electron beam. As a condition when an electron beam is irradiated on the metallic silicon to deposit, other than the degree of decompression of the chamber, an output of an electron gun can be cited. When a melt quantity is about 20 kg or less, an output of an electron gun is better set to 100 to 300 kW, and at about 150 to 250 kW, stable deposition can be realized.

A method for controlling a substrate at a temperature of from 800 to 1100° C. is not particularly restricted. For example, a method where a hot wire is buried in a deposition substrate and an indirect heating method with an infrared heater can be cited. Further, when a deposition substrate is formed into a cylinder, in addition to the embedded heater, a heat medium may be used. Further, in some cases, during vapor deposition, owing to heat of radiation of a melt, the deposition substrate is heated to a temperature higher than a desired temperature; accordingly, it is desirable to use a cooling medium for cooling in combination with a heating medium. In order to control a temperature of a deposition substrate, a direct method where a sheathed thermocouple or a platinum resistance temperature detector is used and a non-contact method where a radiation thermometer or an optical pyrometer is used may be adopted.

According to a method for manufacturing a negative electrode active material of the invention, a deposition film is grown to a thickness from 2 to 30 mm. When, like the invention, a silicon film is deposited on a substrate of which temperature is controlled to a high temperature of from 800 to 1100° C., by holding the silicon film at a high temperature, the crystallinity of the silicon film is increased. When the crystallinity is increased, the volume expansion of the negative electrode material of a non-aqueous electrolyte secondary battery is promoted to increase; accordingly, it is necessary to deposit silicon at a film thickness in the range of from 2 to 30 mm. Further, in the case of a substrate temperature of less than 800° C. and a film thickness of less than 2 mm, the BET specific surface area tends to increase. Accordingly, in order to reduce the BET specific surface area, an additional heating step is necessary to be unfavorable from the economic efficiency. Still further, when the film thickness exceeds 30 mm, fall off the deposition substrate becomes remarkable and a melt surface undulates; accordingly, absorption of the electron beam is disturbed and the energy efficiency is deteriorated.

When the substrate temperature is controlled to 800 to 1100° C. like this, the BET specific surface area of a negative electrode active material prepared later by pulverizing and classifying can be controlled in the range of 0.1 to 2.0 $m^2/g$. The BET specific surface area is more desirable to be 0.5 to 1.5 $m^2/g$. In particular, when the substrate temperature is controlled to 900 to 1000° C., polycrystalline silicon that is small in the BET specific surface area and small in the grain size can be obtained.

As the substrate, a substrate of a material that does not form an alloy with silicon during deposition of silicon is desirably used. That an alloy is not formed with silicon during deposition of silicon means that silicon is not fixed firmly and difficult to form an alloy upon depositing silicon and silicon can be readily peeled after deposition. As a material like this, for example, stainless steel or surface-plated stainless steel can be used. Further, a surface may be provided with the mirror finishing.

Thus, when the deposition substrate is formed of a material that does not form an alloy with silicon during deposition of silicon, deposited silicon can be readily peeled off the substrate, and pulverization and classification can be readily conducted. As a result, the productivity can be improved and a negative electrode active material can be manufactured at a lower cost.

According to a method for manufacturing a negative electrode active material of the invention, the deposition is conducted at a deposition rate exceeding 1 kg/hr. At the present time, a negative electrode active material is demanded to be produced a lot at a low cost; accordingly, the deposition rate of 1 kg/hr or more is necessary. According to a method for manufacturing a negative electrode active material of the invention, even when a very high deposition rate like this is used to deposit, by controlling the substrate temperature to 800 to 1100° C., an increase in the specific surface area owing to generation of pores in a deposited film can be suppressed, and as was described above, the BET specific surface area can be confined to a range of 0.1 to 2.0 $m^2/g$. According to the method for manufacturing a negative electrode active material of the invention, the deposition rate of, in particular, 5 kg/hr or more can be obtained.

When the deposited silicon is subsequently heat treated at a temperature from 300 to 1100° C. in an inert atmosphere or under reduced pressure, the BET specific surface area can be further reduced. The heat treatment can be applied in a state of silicon block after deposition or after pulverization and classification, preferably for about 1 to 5 hr, and particularly preferably at a temperature from 800 to 1000° C. for 1 to 3 hr. By applying the heat treatment, the internal strain of the deposited particles can be alleviated and the BET specific surface area can be reduced. Since the internal strain of the deposited particles is alleviated, crack due to the volume expansion during charge/discharge can be suppressed.

As a physical measure of grains of polycrystalline silicon, a measurement by powder x-ray diffractometry is effective. In the present invention, a grain size is 20 to 100 nm (particularly preferable to be 20 to 80 nm) as a value obtained by a Scherrer method from a half maximum full-width of a diffraction line attributed to Si (111) in the proximity of $2\theta=28.4°$ in an analysis of an X-ray pattern, which uses SRM640c (single crystal silicon) that is a standard sample for x-ray diffraction manufactured by NIST.

On the other hand, a grain size of metallic silicon or polycrystalline silicon manufactured according to an existing process such as a unidirectional solidification process, a quenching process or a high-temperature plastic working process is 500 to 700 nm and inadequate for a non-aqueous electrolyte secondary battery.

Further, the true density of the polycrystalline silicon manufactured according to a direct vapor deposition process from the metallic silicon of the invention is higher than 2.250 $g/cm^3$ and less than 2.330 $g/cm^3$, which is lower than that of the single crystal silicon. A value of the true density of the metallic silicon is 2.33 $g/cm^3$, and the true density of the polycrystalline silicon of the invention is remarkably different from that of the metallic silicon.

As a mechanical measure of the grains of the polycrystalline silicon, the compressive strength of grain is effective.

Here, as a feature of alloy-type active material, a large volume change during a storing/releasing process of lithium is cited. It is known that, while the volume expansion of a graphite active material is about 1 to 1.2 times, the volume expansion of the silicon active material is known to be about four times at the maximum. Accordingly, it is necessary to suppress a problem that the grains are fractured with the passage of cycles without enduring the strain when the volume expansion occurred owing to charge.

When the compressive strength of grains is measured with a microcompression tester (manufactured by Shimadzu Corporation), while the single crystal silicon shows 400 MPa, when amorphous silicon is prepared at a deposition substrate temperature of 300° C. or less, grains having 100 MPa are observed. Fragile grains like this are microparticulated with passage of cycles to result in destroying a negative electrode.

Accordingly, the compressive strength is preferable to be higher than at least 400 MPa and less than 800 MPa, and more preferable to be 600 MPa or less. When the particle strength is 800 MPa or more, in some cases, a pulverization process takes a long time to be undesirable.

According to a method for manufacturing a negative electrode active material for a non-aqueous electrolyte secondary battery according to the invention, when a metallic silicon raw material is deposited on a substrate, one or more of dopants selected from boron, aluminum, phosphorus, titanium, vanadium, chromium, manganese, iron, cobalt, nickel, copper, zinc, germanium, arsenic, tin, tantalum, and tungsten can be doped in the silicon to be deposited.

A negative electrode active material of polycrystalline silicon particles obtained by depositing the metallic silicon as a raw material on a substrate is inferior in the bulk conductivity compared with that of metallic silicon of the metallurgical grade, which contains originally boron, phosphorus, oxygen, aluminum, iron, and calcium. However, thus, when the metallic silicon as a raw material is deposited on a substrate, by doping one or more of dopants selected from boron, aluminum, phosphorus, titanium, vanadium, chromium, manganese, iron, cobalt, nickel, copper, zinc, germanium, arsenic, tin, tantalum, and tungsten, the bulk conductivity of the negative electrode active material of resulted polycrystalline silicon particles can be improved, and the negative electrode active material capable of manufacturing a secondary battery excellent in the cycle characteristics can be obtained.

In order to make silicon that was deposited according to an electron beam deposition method and recovered from a substrate have a predetermined particle size, pulverization and classification are conducted according to a known process.

Among these, as a pulverizer, a ball mill where pulverizing medium such as balls or beads, for example, are moved, and an impact force, friction force or compression force due to the kinetic energy thereof is used to pulverize a matter to be pulverized, a medium stirring mill, a roller mill that makes use of a compression force due to a roller to pulverize, a jet mill where a matter to be pulverized is collided at high-speed with a liner material or particles are collided with each other, and an impact force thereof owing to the impact is used to pulverize, a hammer mill where by making use of an impact force owing to rotation of a rotor to which hammers, blades and pins are fixed, a matter to be pulverized is pulverized, a pin mill, a disc mill, a colloid mill that makes use of a shearing force, or a high-pressure wet type ultra-pulverization, emulsification and dispersion equipment "ULTIMIZER" can be used. Both of dry and wet pulverization processes can be used.

Further, in order to adjust a particle size distribution, after pulverization, a dry classification, wet classification or sieving and classifying process is conducted. In the dry classification process, mainly with an air flow, processes of dispersion, separation (separation between microparticles and coarse particles), collection (separation of gas and solid), and exhausting are sequentially or simultaneously conducted. In order for the classification efficiency not to be deteriorated under the influence of interference between particles with each other, particle shape, irregularity of air flow, speed distribution, and electrostatic charge, before classification, a pretreatment (adjustment of moisture, dispersibility, humidity) is applied, or moisture content and oxygen concentration of the air flow to be used are adjusted. Further, in a dry type where a classifier is formed in one body, pulverization and classification are conducted at one time and a desired particle size distribution can be obtained.

The pulverization and classification can be conducted so that a particle size of a negative electrode active material for a non-aqueous electrolyte secondary battery may be 1 µm or more and 20 µm or less by a volume average value $D_{50}$ (that is, a particle size or median size when an accumulated volume is 50%) according to a laser diffraction scattering particle size distribution measurement method. When the $D_{50}$ is set to 1 µm or more, the risk that the bulk density is deteriorated and the charge/discharge capacity per unit volume is deteriorated can be made as small as possible. Further, when the $D_{50}$ is set to 20 µm or less, the risk of penetrating through a negative electrode film to cause short-circuiting can be suppressed to the minimum, and, without making difficult to form an electrode, the likelihood of peeling off a current collector can be made sufficiently low.

Further, by subjecting the polycrystalline silicon particles that were pulverized in advance to a predetermined particle size to a thermochemical vapor deposition process under normal pressure or reduced pressure at a temperature from 600 to 1200° C. (preferably from 800 to 1000° C.) for a time as short as possible by introducing a hydrocarbon compound gas and/or steam, a carbon film may be formed on a surface of the polycrystalline silicon to further improve the conductivity.

The negative electrode active material of polycrystalline silicon particles, which was manufactured according to a method of the invention like this, can be used as a negative electrode active material for a non-aqueous electrolyte secondary battery. The negative electrode active material thus obtained has a capacity higher than that of existing graphite, and a reversible capacity smaller than that of silicon oxide and a material obtained from silicon oxide as a raw material (for example, (silicon/silicon dioxide)-dispersed composite obtained by inhomogenization of silicon oxide). Further, even when compared with the metallic silicon itself, the volume change accompanying charge/discharge is controlled smaller, and the adhesiveness between particles and the binder is excellent. Accordingly, a non-aqueous electrolyte secondary battery, in particular, a lithium ion secondary battery excellent in the cycle characteristics can be manufactured.

Further, since the negative electrode active material can be manufactured from less expensive metallic silicon as a raw material, the negative electrode active material is, while having excellent battery characteristics, greatly cheap. Accordingly, also a manufacturing cost of a non-aqueous electrolyte secondary battery can be reduced.

Still further, when a negative electrode material is manufactured from an active material containing polycrystalline silicon particles of the invention, a binder may be contained therein. As the binder, particularly, a polyimide resin can be used. Other than the polyimide resin, also a polyamide resin, in particular, an aromatic polyimide resin can be adopted. For example, the aromatic polyimide resin is excellent in the solvent resistance and can suppress the negative electrode material from peeling off a current collector following the volume expansion owing to charge/discharge and an active material from separating.

Now, the aromatic polyimide resin is generally difficult to dissolve in an organic solvent, and, in particular, necessary not to swell or dissolve with respect to an electrolyte solution. Since the aromatic polyimide resin is dissolved only in an organic solvent having a high boiling temperature, cresol, for example, upon manufacturing an electrode paste, it is desirable to add a precursor of a polyimide in a state of polyamic acid that is relatively readily dissolved in various organic solvents such as dimethylformamide, dimethylacetamide, N-methylpyrrolidone, ethyl acetate, acetone, methyl ethyl ketone, methyl isobutyl ketone, and dioxolane and heated at a temperature of 300° C. or more for a long time to dehydrate and imidize to obtain a binder.

In this case, the aromatic polyimide resin has a basic skeleton configured of tetracarboxylic acid dianhydride and diamine. Specific examples of tetracarboxylic acid dianhydrides include: aromatic tetracarboxylic acid dianhydride such as pyromellitic acid dianhydride, benzophenone tetracarboxylic acid dianhydride and biphenyl tetracarboxylic acid dianhydride; alicyclic tetracarboxylic acid dianhydride such as cyclobutane tetracarboxylic acid dianhydride, cyclopentane tetracarboxylic acid dianhydride, and cyclohexane tetracarboxylic acid dianhydride; and aliphatic tetracarboxylic acid dianhydride such as butane tetracarboxylic acid dianhydride.

Examples of diamines include aromatic diamines such as p-phenylenediamine, m-phenylenediamine, 4,4'-diaminodiphenylmethane, 4,4'-diaminodiphenyl ether, 2,2'-diaminodiphenylpropane, 4,4'-diaminodiphenyl sulfone, 4,4'-diaminobenzophenone, 2,3-diaminonaphthalene, 1,3-bis(4-aminophenoxy)benzene, 1,4-bis(4-aminophenoxy)benzene, 4,4'-di(4-aminophenoxy)diphenyl sulfone, and 2,2'-bis[4-(4-aminophenoxy)phenyl]propane; alicyclic diamines; and aliphatic diamines.

As a synthetic method of a polyamic acid intermediate, usually, a solution polymerization process is preferably used. Examples of solvents used in the solution polymerization process include N,N'-dimethylformamide, N,N'-dimethylacetamide, N-methyl-2-pyrrolidone, N-methyl caprolactam, dimethyl sulfoxide, tetramethylurea, pyridine, dimethyl sulfone, hexamethylphosphoramide and butyrolactone. These solvents may be used singularly or in a mixture thereof.

A reaction temperature at this time is usually in the range of −20 to 150° C. and particularly desirably in the range of −5 to 100° C.

When a polyamic acid intermediate is converted into a polyimide resin, usually, a process where dehydration ring closure is conducted by heating is taken. The dehydration ring closure temperature by heating is 140 to 400° C., and preferably an optional temperature from 150 to 250° C. can be selected. A time necessary for the dehydration ring closure is, though depending on the reaction temperature, 30 sec to 10 hr and preferably 5 min to 5 hr.

As the polyimide resin like this, other than polyimide resin powder, a N-methylpyrrolidone solution of a polyimide precursor is available. For example, U-varnish A, U-Varnish S, UIP-R and UIP-S (trade name, manufactured by Ube Industries, Ltd.), KAYAFLEX KPI-121 (trade name, manufactured by Nippon Kayaku Co., Ltd.), RIKACOAT SN-20, PN-20 and EN-20 (trade name, manufactured by New Japan Chemical Co., Ltd.) can be cited.

Among blending quantities of a negative electrode active material and a binder in the negative electrode material of the invention, a blending quantity of the negative electrode active material can be set to 60 to 97% by mass (particularly 70 to 95% by mass, especially 75 to 95% by mass). When a conductive agent that is described below is blended in the negative electrode material, the upper limit of the blending quantity of the negative electrode active material is better to be 96% by mass or less (94% by mass or less, in particular 93% by mass or less).

Further, a blending quantity of a binder in the negative electrode material is better to be a ratio of 3 to 20% by mass (more desirably 5 to 15% by mass) with respect to an entire active material. When the blending quantity of the binder is set within the range, the risk of separation of the negative electrode active material can be made as small as possible. In addition, since the porosity is reduced and an insulation thickness is increased, the risk of disturbing transfer of Li ions can be made as small as possible.

When a negative electrode material is prepared with the polycrystalline silicon particles as an active material and a polyimide resin as a binder, in addition thereto, a conductive agent such as graphite can be added.

In this case, as long as the conductive agent is an electronic conductive material that does not cause decomposition and modification in a configured battery, the kind thereof is not particularly restricted. Specific examples thereof include powders and fibers of metals such as Al, Ti, Fe, Ni, Cu, Zn, Ag, Sn and Si; and graphites such as natural graphite, artificial graphite, various kinds of cokes powders, mesophase carbons, gas phase grown carbon fibers, pitch carbon fibers, PAN carbon fibers, and various kinds of resin sintered bodies.

When the conductive agent is dispersed in advance in water or a solvent such as N-methyl-2-pyrrolidone and added, an electrode paste in which the conductive agent is uniformly attached to or dispersed in polycrystalline silicon particles can be prepared. Accordingly, the conductive agent is preferably added as the solvent dispersion. The conductive agent can be dispersed in the solvent with a known surfactant. Further, a solvent that is used for the conductive agent is desirable to be the same as that used in the binder.

When a conductive agent is used, an addition quantity thereof is 0 to 37% by mass (further, 1 to 37% by mass) in an entire negative electrode material, and, when the conductive agent is blended in water or a solvent, a blending quantity is preferable to be 1 to 37% by mass (further, 1 to 20% by mass, in particular, 2 to 10% by mass).

When the addition quantity and blending quantity of the conductive agent are set in the ranges, the negative electrode material can be surely prevented from being deficient in the conductivity of the negative electrode material to be high in the initial resistance. Further, the risk that a quantity of the conductive agent increases to deteriorate the battery capacity can be avoided.

Further, other than the polyimide resin binder, as a viscosity modifier, carboxymethylcellulose, sodium polyacrylate, other acrylic polymer or fatty acid ester may be added.

The negative electrode material for a non-aqueous electrolyte secondary battery of the invention can form a negative electrode as shown below, for example. That is, a negative electrode material of the negative electrode active material, the conductive agent, the binder and the other additives is kneaded with a solvent such as N-methylpyrrolidone or water suitable for dissolving and dispersing the binder to form a pasty mixture, and the mixture is coated in sheet on a current collector. In this case, as a current collector, a material that is usually used as a current collector of a negative electrode such as copper foil and nickel foil can be used without restricting in particular a thickness and surface treatment. As a method for forming a mixture in sheet, without particularly restricting, a known method can be used.

A negative electrode containing a negative electrode material for a non-aqueous electrolyte secondary battery like this is mainly configured of a negative electrode active material of polycrystalline silicon particles that are greatly small in the volume change during charge/discharge in comparison with that of the existing silicon particles, and the film thickness change between before and after charge/discharge does not exceeds three times (in particular, 2.5 times).

When a negative electrode compact that uses the negative electrode thus obtained is used, a non-aqueous electrolyte secondary battery, in particular, a lithium ion secondary battery can be manufactured. In this case, a non-aqueous electrolyte secondary battery is characterized in that the negative electrode compact is used, and materials such as other positive electrode (compact), a separator, an electrolyte solution, and a non-aqueous electrolyte and a battery shape are not particularly restricted.

For example, as a positive electrode active material, oxides or sulfides capable of storing and releasing lithium ions can be cited, and one or more thereof are used. Specifically, metal sulfides or metal oxides such as $TiS_2$, $MoS_2$, $NbS_2$, $ZrS_2$, $VS_2$ or $V_2O_5$, $MoO_3$ and $Mg(V_3O_8)$, which do not contain lithium, or lithium and lithium composite oxides that contain lithium can be cited, further also composite metals such as $NbSe_2$, and olivine iron can be cited. Among these, in order to obtain higher energy density, lithium composite oxides mainly made of $Li_pMetO_2$ are desirable. The Met is preferably at least one of cobalt, nickel, iron and manganese, and p is usually a value in the range of $0.05 \leq p \leq 1.10$. Specific examples of the lithium composite oxides like this include $LiCoO_2$, $LiNiO_2$, $LiFeO_2$, $Li_qNi_rCo_{1-r}O_2$ (values of q and r are different depending on a charge/discharge state of a battery, usually, $0<q<1$, $0.7<r\leq1$), which have a layered structure, and $LiMn_2O_4$ having a spinel structure, and orthorhombic $LiMnO_2$ can be cited. Further, as a high voltage responsive type, as substituted spinel manganese compound, also $LiMet_sMn_{1-s}O_4$ ($0<s<1$) is used, and as the Met in this case, titanium, chromium, iron, cobalt, nickel, copper and zinc can be cited.

The lithium composite oxides can be prepared in such a manner that, for example, carbonate, nitrate, oxide or hydroxide of lithium and carbonate, nitrate, oxide or hydroxide of transition metal are pulverized and mixed according to a desired composition and fired at a temperature in the range of 600 to 1,000° C. in an oxygen atmosphere.

Further, as a positive electrode active material, also organic substances can be used. Examples of the organic substances include polyacetylene, polypyrrole, polyparaphenylene, polyaniline, polythiophene, polyacene, and polysulfide compounds.

The positive electrode active material is kneaded with the conductive agent and the binder, which were used in the negative electrode mixture, coated on a current collector, and formed into a positive electrode compact according to a known process.

Further, a separator that is used between a positive electrode and a negative electrode is not particularly restricted as long as it is stable against an electrolyte solution and excellent in the liquid retaining properties. In general, porous sheets or nonwoven fabrics of polyolefins such as polyethylene and polypropylene and copolymers thereof, and an aramide resin can be cited. These may be used in a single layer or in multilayer by superposing, or, on a surface thereof, ceramic such as metal oxide may be stacked. Further, also porous glass and ceramics can be used.

A solvent for non-aqueous electrolyte secondary battery used in the invention is not particularly restricted as long as it can be used as a non-aqueous electrolyte solution. In general, non-protonic high-dielectric solvents such as ethylene carbonate, propylene carbonate, butylene carbonate, and γ-butyrolactone; and nonprotonic low viscosity solvents such as dimethyl carbonate, ethyl methyl carbonate, diethyl carbonate, methyl propyl carbonate, dipropyl carbonate, diethyl ether, tetrahydrofuran, 1,2-dimethoxyethane, 1,2-diethoxyethane, 1,3-dioxolane, sulfolane, methylsulfolane, acetonitrile, propionitrile, anisole, acetic acid esters such as methyl acetate, or propionic acid esters can be cited. It is desirable to use the nonprotonic high-dielectric solvents and the nonprotonic low viscosity solvents in a combination at an appropriate mixing ratio. Further, an ionic liquid that uses imidazolium, ammonium and pyridinium type cations may be used. As a counter anion, $BF_4^-$, $PF_6^-$, and $(CF_3SO_2)_2N^-$ are cited without particular restriction. The ionic liquid can be mixed with the non-aqueous electrolyte solvent and used.

When a solid electrolyte or gel electrolyte is used as a non-aqueous electrolyte, polymer materials such as silicone gel, silicone polyether gel, acryl gel, silicone acryl gel, acrylonitrile gel and poly(vinylidene fluoride) may be contained therein. These may be polymerized in advance or polymerized after liquid injection. These may be used singularly or as a mixture thereof.

Further, as an electrolyte salt, light metal salts can be cited, for example. Examples of light metal salts include alkali metal salts such as lithium salts, sodium salts or potassium salts; or alkaline earth metal salts such as magnesium salts or calcium salts; or aluminum salts, and depending on the object, one kind or a plurality of kinds thereof is selected. Examples of lithium salts include $LiBF_4$, $LiClO_4$, $LiPF_6$, $LiAsF_6$, $CF_3SO_3Li$, $(CF_3SO_2)_2NLi$, $C_4F_9SO_3Li$, $CF_3CO_2Li$, $(CF_3CO_2)_2NLi$, $C_6F_5SO_3Li$, $C_8F_{17}SO_3Li$, $(C_2F_5SO_2)_2NLi$, $(C_4F_9SO_2)(CF_3SO_2)NLi$, $(FSO_2C_6F_4)(CF_3SO_2)NLi$, $((CF_3)_2CHOSO_2)_2NLi$, $(CF_3SO_2)_3CLi$, $(3,5-(CF_3)_2C_6F_3)_4BLi$, $LiCF_3$, $LiAlCl_4$ or $C_4BO_8Li$. These may be used singularly or in a combination of two or more kinds thereof.

A concentration of an electrolyte salt in a non-aqueous electrolyte solution is desirable to be 0.5 to 2.0 mol/L from the viewpoint of the electroconductivity. The conductivity of the electrolyte at 25° C. is desirable to be 0.01 S/cm or more and controlled by the kind of the electrolyte salt or a concentration thereof.

Further, in the non-aqueous electrolyte solution, as required, various kinds of additives may be added. For example, in order to improve the cycle life, vinylene carbonate, methyl vinylene carbonate, ethyl vinylene carbonate or 4-vinylethylene carbonate may be added. In order to prevent the overcharge, biphenyl, alkylbiphenyl, cyclohexylbenzene, t-butylbenzene, diphenyl ether, or benzofuran may be added. In order to deoxidize and dehydrate, various kinds of carbonate compounds, various kinds of carboxylic acid anhydrides, or various kinds of nitrogen- and sulfur-containing compounds may be added.

A shape of a non-aqueous electrolyte secondary battery is optional without particular restriction. In general, a coin type where an electrode and a separator that were punched in coin are stacked, a rectangular type or cylindrical type where an electrode sheet and a separator were spirally wound can be cited.

EXAMPLES

Hereinafter, the present invention will be more specifically described with reference to examples and comparative examples. However, the present invention is not restricted thereto. In the following examples, % denotes % by mass, and an average particle size denotes a value measured by a cumulative volume 50% diameter $D_{50}$ (or median diameter) in a particle size distribution measurement according to a laser light scattering method.

Example 1

Inside a vacuum chamber having an exhaust system of an oil diffusion pump, a mechanical booster pump and an oil rotary vacuum pump, a copper crucible was set, an ingot of 20 kg metallic silicon containing 0.2% of cobalt was charged, and the inside of the chamber was depressurized. Pressure attained after 2 hr was $2 \times 10^{-4}$ Pa.

Next, a straight electron gun provided to the chamber started to melt the ingot of metallic silicon, and, after melting the ingot of the metallic silicon, vapor deposition was continued for 2 hr at an output of 220 kW. During the vapor deposition, a temperature of a deposition substrate of stainless steel was controlled at 800° C.

Thereafter, by opening the chamber, 2.5 kg of deposited silicon containing 1% of cobalt was obtained. That is, the vapor deposition rate is 2.5 kg/2 hr=1.25 kg/hr. Further, a vapor deposition thickness was 18 mm.

The resulted deposited silicon was, after pulverizing by a jet mill (trade name: AFG-100, manufactured by Hosokawa Micron Corporation) under the number of rotations of a classifier of 7,200 rpm, classified by a classifier (trade name: TC-15, manufactured by Nisshin Engineering Inc.), and silicon particles of polycrystalline silicon having $D_{50}$=10.0 μm were obtained.

A crystallite size was confirmed to be 60 nm according to a Scherrer method from a half maximum full-width of an X-ray diffraction line of silicon particles in the polycrystalline silicon. Further, the true density was 2.312 g/cm³, and the compressive strength was 528 MPa. The BET specific surface area was 0.98 m²/g.

Example 2

In a manner similar to that of Example 1 except that in place of the ingot of metallic silicon containing 0.2% of cobalt, an ingot of metallic silicon having a purity of 98.5% was used, and a temperature of the deposition substrate of stainless was controlled to 1100° C., 2.5 kg of polycrystalline silicon particles was obtained. The vapor deposition rate was 2.5 kg/2 hr=1.25 kg/hr.

The polycrystalline silicon particles had $D_{50}$=9.8 μm and the crystallite size thereof was confirmed to be 85 nm according to a Scherrer method from a half maximum full-width of an X-ray diffraction line. Further, the true density thereof was 2.315 g/cm³, the compressive strength was 550 MPa, and the BET specific surface area was 0.94 m²/g.

Comparative Example 1

In a manner similar to that of Example 2 except that a temperature of a substrate on which metallic silicon raw material is deposited was set to 300° C., 2.5 kg of polycrystalline silicon particles was obtained. The vapor deposition rate was 2.5 kg/2 hr=1.25 kg/hr.

The polycrystalline silicon had $D_{50}$=10.0 μm and the crystallite size thereof was confirmed to be 20 nm according to a Scherrer method from a half maximum full-width of an X-ray diffraction line. Further, the true density was 2.291 g/cm³, the compressive strength was 388 MPa, and the BET specific surface area was 5.2 m²/g.

Comparative Example 2

The polycrystalline silicon particles obtained according to Comparative Example 1 were heat treated at 1000° C. for 3 hr under an argon atmosphere.

The polycrystalline silicon had $D_{50}$=10.0 μm and the crystallite size thereof was confirmed to be 50 nm according to a Scherrer method from a half maximum full-width of an X-ray diffraction line. Further, the true density was 2.318 g/cm³, the compressive strength was 485 MPa, and the BET specific surface area was 2.8 m²/g. Accordingly, although the BET specific surface area reduction effect owing to the heat treatment can be recognized, the BET specific surface area still maintained a high value.

Comparative Example 3

In a manner similar to that of Example 2 except that a temperature of a substrate on which metallic silicon raw material is deposited was set to 900° C. and the vapor deposition time was set to 20 min, 0.4 kg of polycrystalline silicon particles was obtained. The vapor deposition rate was 4 kg/20 min=1.20 kg/hr.

The polycrystalline silicon particles had $D_{50}$=10.1 μm and the crystallite size thereof was confirmed to be 75 nm according to a Scherrer method from a half maximum full-width of an X-ray diffraction line. Further, the true density was 2.324 g/cm$^3$, the compressive strength was 400 MPa, and the BET specific surface area was 2.3 m$^2$/g.

Comparative Example 4

In a manner similar to that of Example 2 except that a temperature of a substrate on which metallic silicon raw material is deposited was set to 1000° C. and the vapor deposition time was set to 4 hr, 4.5 kg of polycrystalline silicon particles was obtained. The vapor deposition rate was 4.5 kg/4 hr=1.13 kg/hr.

The polycrystalline silicon particles had $D_{50}$=9.9 μm and the crystallite size thereof was confirmed to be 180 nm according to a Scherrer method from a half maximum full-width of an X-ray diffraction line. Further, the true density was 2.331 g/cm$^3$, the compressive strength was 500 MPa, and the BET specific surface area was 1.3 m$^2$/g.

Of the polycrystalline silicon obtained according to each of manufacturing methods of Examples 1 and 2 and Comparative Examples 1 to 4, results of silicon crystal particle size, true density, compressive strength, BET specific surface area, specific resistance, and $D_{50}$ are summarized together with substrate temperature when silicon was deposited on a substrate and deposition film thickness in Table 1. The true density of polycrystalline silicon was measured according to a gas absorption method that uses helium gas (pycnometer). Further, the specific resistance was measured according to an AC impedance method that uses four terminals.

more of the silicon crystal particle size, the true density, the compressive strength, the BET specific surface area were outside of the range of the invention.

Further, as illustrated in Table 1, when the specific resistances are compared, it was found that, in the negative electrode active material of Example 1, by doping cobalt, the bulk resistance was reduced in comparison with that of the negative electrode active material of Example 2, that is, the conductivity is excellent.

<Evaluation of Battery Characteristics>

In order to confirm the usefulness of the negative electrode active materials obtained according to Examples 1 and 2 and Comparative Examples 1 to 4, as shown below, the battery characteristics were evaluated.

A mixture of 81% of a negative electrode active material, 9% of artificial graphite (average particle size $D_{50}$=3 μm) as a conductive agent, and 2.5% as a solid content of a N-methylpyrrolidone dispersion of acetylene black (solid content 17.5%) was diluted with N-methylpyrrolidone. Thereto, 7.5% in terms of solid content of a polyimide resin (trade name: U-Varnish A, manufactured by Ube Industries Ltd., solid content=18%) was added as a binder and a slurry was obtained.

The slurry was coated on a copper foil having a thickness of 12 μm using a doctor blade of 50 μm, after drying at 200° C. for 2 hr, compression molded into an electrode by a roller press at 60° C., and finally punched into 2 cm$^2$ to form a negative electrode compact.

Four pieces of lithium ion secondary batteries were prepared for each of the resulted negative electrode compacts

TABLE 1

|  | Substrate Temperature (° C.) | Film Thickness (mm) | Crystal Size (nm) | True Density (g/m$^3$) | Compressive strength (MPa) | BET Specific Surface Area (m$^2$/g) | Specific Resistance (Ω · cm) | $D_{50}$ (μm) |
|---|---|---|---|---|---|---|---|---|
| Example 1 | 800 | 18 | 60 | 2.312 | 528 | 0.98 | 50k | 10.0 |
| Example 2 | 1100 | 15 | 85 | 2.315 | 550 | 0.94 | 2.5M | 9.8 |
| Comparative Example 1 | 300 | 15 | 20 | 2.291 | 388 | 5.2 | 2.5M | 10.0 |
| Comparative Example 2 | 300° C. (during deposition) and 1000° C. (heating temperature after deposition) | — | 50 | 2.318 | 485 | 2.8 | 2.5M | 10.0 |
| Comparative Example 3 | 900 | 1.1 | 75 | 2.324 | 400 | 2.3 | 2.5M | 10.1 |
| Comparative Example 4 | 1000 | 33 | 180 | 2.331 | 500 | 0.98 | 2.5M | 9.9 |

As shown in Table 1, negative electrode active materials of Examples 1 and 2 where a substrate temperature at which the metallic silicon as a raw material is deposited was controlled at a temperature in the range of 800 to 1100° C. had grain size of silicon in the range of 20 to 100 nm, the true density in the range of exceeding 2.250 and less than 2.330 g/cm$^3$, the compressive strength that exceeds 400 MPa and is smaller than 800 MPa, and the BET specific surface area in the range of 0.1 to 2.0 m$^2$/g. That is, it was found that all were negative electrode active materials that satisfy the ranges of the negative electrode active material of the invention.

On the other hand, in negative electrode active materials of Comparative Examples 1 and 2 where the substrate temperature was controlled to less than 300° C., and Comparative Examples 3 and 4 where a film thickness of the deposited material was set to 1.1 or 33 mm, at least one or with a lithium foil as a counter electrode, a non-aqueous electrolyte solution obtained by dissolving lithium bis(trifluoromethanesulfonyl)imide at a concentration of 1 mol/L in a 1/1 (volume ratio) mixed solution of ethylene carbonate and diethyl carbonate as a nonaqueous electrolyte, and a polyethylene microporous film having a thickness of 30 μm as a separator.

The lithium ion secondary batteries thus prepared were aged at room temperature overnight. Two of these were broken down, a thickness of the negative electrode was measured, and the electrode density based on an initial weight in a swelled state with the electrolyte solution was calculated. The electrolyte solution and a quantity of lithium increased by charge were not contained.

Further, with remaining two pieces, charging was conducted with a secondary battery charge/discharge test apparatus (manufactured by Nagano Co., Ltd.) at a constant current of 0.15 c until a voltage of a test cell reaches 0 V, and, after reaching 0 V, charging was conducted by decreasing a current so as to maintain a cell voltage at 0 V. Thereafter, when a current value becomes smaller than 0.02 c, the charging was stopped and charge capacity was calculated. Herein, c is a current value that charges a theoretical capacity of a negative electrode during 1 hr.

After the end of charging, these lithium ion secondary batteries for evaluation were broken down and a thickness of each of the negative electrodes was measured. From the calculated thickness, in a similar manner, the electrode density was calculated, and a charge capacity per unit volume during charging was obtained. Results there of are shown in Table 2.

TABLE 2

|  | Substrate Temperature (° C.) | Electrode Density after Aging (g/cm$^3$) | Volume Change Magnification | Electrode Density after Charge (g/cm$^3$) | Charge Capacity (mAh/cc) |
|---|---|---|---|---|---|
| Example 1 | 800 | 1.19 | 2.1 | 0.57 | 2166 |
| Example 2 | 1100 | 1.21 | 2.2 | 0.55 | 2090 |
| Comparative Example 1 | 300 | 1.19 | 3.6 | 0.33 | 1254 |
| Comparative Example 2 | 300° C. (during deposition) and 1000° C. (heating temperature after deposition) | 1.18 | 3.1 | 0.38 | 1444 |
| Comparative Example 3 | 900 | 1.20 | 3.5 | 0.34 | 1292 |
| Comparative Example 4 | 1000 | 1.21 | 3.1 | 0.39 | 1482 |

As illustrated in Table 2, it was found that in negative electrode compacts that used negative electrode active materials of Examples 1 and 2 where a substrate temperature was controlled at a temperature in the range of 800 to 1100° C. and all of the grain size, the true density, the compressive strength, and the BET specific surface area were in the range of the negative electrode active material of the invention, all of the electrode density, volume change magnification, and the electrode density after charge have excellent values, also the charge capacity is over 1500 mAh/cc, and the charge/discharge capacity is excellent.

On the other hand, when the negative electrode active material of Comparative Example 1, in which a grain size can not be observed because of being amorphous and the true density is small, is used, because of large BET specific surface area, a quantity of binder becomes deficient to be large in the volume expansion. Further, it was found that also the negative electrode material that used a negative electrode active material of Comparative Example 4 that has a grain size exceeding 100 nm is large in the volume expansion the same as that of Comparative Example 1 and does not increase the battery capacity per unit volume.

The present invention is not restricted to the embodiments. The embodiments are illustrative examples and all what has substantially the like configuration with a technical idea described in claims of the invention and like advantages is contained in the technical range of the invention.

What is claimed is:

1. A method for manufacturing a negative electrode active material for a secondary battery that uses a non-aqueous electrolyte, comprising the steps of:
   depositing silicon according to an electron beam vapor-deposition method with metallic silicon as a raw material on a substrate, a temperature of the substrate being controlled from 800 to 1100° C., wherein the depositing is performed at a vapor deposition rate exceeding 1 kg/hr, and is performed so that the film thickness of the deposited silicon is in the range of 2 to 30 mm; and
   pulverizing and classifying the deposited silicon to obtain the negative electrode active material.

2. The method for manufacturing a negative electrode active material for a non-aqueous electrolyte secondary battery according to claim 1, wherein, when silicon is deposited on the substrate with the metallic silicon as a raw material, one or more of dopants selected from boron, aluminum, phosphorus, titanium, vanadium, chromium, manganese, iron, cobalt, nickel, copper, zinc, germanium, arsenic, tin, tantalum, and tungsten are doped in the silicon to be deposited.

3. The method for manufacturing a negative electrode active material for a non-aqueous electrolyte secondary battery according to claim 2, wherein the pulverization and classification are conducted so that a particle size of the negative electrode active material for a non-aqueous electrolyte secondary battery is 1 μm or more and 20 μm or less by the volume average value $D_{50}$ according to a laser diffraction scattering particle size distribution measurement method.

4. The method for manufacturing a negative electrode active material for a non-aqueous electrolyte secondary battery according to claim 3, wherein the substrate is made of a material that does not form an alloy with silicon when depositing silicon.

5. The method for manufacturing a negative electrode active material for a non-aqueous electrolyte secondary battery according to claim 2, wherein the substrate is made of a material that does not form an alloy with silicon when depositing silicon.

6. The method for manufacturing a negative electrode active material for a non-aqueous electrolyte secondary battery according to claim 1, wherein the pulverization and classification are conducted so that a particle size of the negative electrode active material for a non-aqueous electrolyte secondary battery is 1 μm or more and 20 μm or less by the volume average value $D_{50}$ according to a laser diffraction scattering particle size distribution measurement method.

7. The method for manufacturing a negative electrode active material for a non-aqueous electrolyte secondary battery according to claim 6, wherein the substrate is made of a material that does not form an alloy with silicon when depositing silicon.

8. The method for manufacturing a negative electrode active material for a non-aqueous electrolyte secondary battery according to claim 1, wherein the substrate is made of a material that does not form an alloy with silicon when depositing silicon.

9. The method for manufacturing a negative electrode active material for a non-aqueous electrolyte secondary battery according to claim 1, wherein the negative electrode active material is a polycrystalline silicon that has a true density higher than 2.250 g/cm$^3$ and less than 2.330 g/cm$^3$, a volume average value $D_{50}$ of the negative electrode active material according to a laser scattering and diffracting particle size distribution measurement method is 1 µm to 20 µm, and a BET specific surface area of the negative electrode active material is 0.1 to 2.0 m²/g.

10. The method for manufacturing a negative electrode active material for a non-aqueous electrolyte secondary battery according to claim 1, wherein in the step of depositing silicon, a degree of decompression is $1\times10^{-5}$ to $1\times10^{-2}$ Pa, and an output of an electron gun is 100 to 300 kW.

* * * * *